(12) United States Patent
Lindorfer

(10) Patent No.: US 8,195,051 B2
(45) Date of Patent: Jun. 5, 2012

(54) ROTATING DATA TRANSMISSION DEVICE WITH ACTIVE COMPENSATION OF TRANSMISSION FUNCTION

(75) Inventor: Stefan Lindorfer, Munich (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 529 days.

(21) Appl. No.: 12/395,828

(22) Filed: Mar. 2, 2009

(65) Prior Publication Data

US 2009/0220247 A1    Sep. 3, 2009

(30) Foreign Application Priority Data

Mar. 3, 2008 (DE) .......................... 10 2008 000 487

(51) Int. Cl.
*H04B 10/00* (2006.01)
*H04B 10/06* (2006.01)
*A61B 6/00* (2006.01)
(52) U.S. Cl. .............................. 398/114; 398/208; 378/4
(58) Field of Classification Search .................. 398/114, 398/208; 378/4, 15, 19
See application file for complete search history.

(56) References Cited

U.S. PATENT DOCUMENTS

| 5,880,645 | A | 3/1999 | Everitt et al. |
| 6,433,631 | B2 | 8/2002 | Pearson, Jr. et al. |
| 6,862,299 | B2 | 3/2005 | Popescu |
| 2006/0013597 | A1* | 1/2006 | Crivelli et al. ................ 398/208 |
| 2007/0152783 | A1* | 7/2007 | Krumme et al. ............... 333/245 |
| 2007/0262910 | A1* | 11/2007 | Popescu ........................ 343/754 |

OTHER PUBLICATIONS

Cartledge et al., "Performance of Smart Lightwave Receivers with Linear Equalization," Journal of Lightwave Technology, vol. 10, No. 8, Aug. 1992, pp. 1105-1109.

* cited by examiner

*Primary Examiner* — Dawayne A Pinkney
(74) *Attorney, Agent, or Firm* — Kevin L. Daffer; Daffer McDaniel, LLP

(57) ABSTRACT

A rotating data transmission device for transmitting data from a data source to a data sink between a rotating part and a stationary part comprises a transmitting conductor arrangement which is fed from a transmitter means, and also a receiver means which taps signals from the transmitting conductor arrangement with the aid of a receiving coupler arrangement. The connection between data source and rotating data transmission device, or rotating data transmission device and data sink, is effected by means of light-waveguides. The receivers of the light-waveguides are linear receivers followed by equalizers for correcting the frequency and phase response.

12 Claims, 2 Drawing Sheets

ROTATING DATA TRANSMISSION DEVICE WITH ACTIVE COMPENSATION OF TRANSMISSION FUNCTION

PRIORITY CLAIM

The present application claims priority to pending German Patent Application No. 102008000487.1 filed on Mar. 3, 2008.

BACKGROUND OF THE INVENTION

1. Field of the Invention

The invention relates to a rotating data transmission system for transmission of data between a rotating part and a stationary part, in particular between a rotating part and a stationary part of a computer tomograph, and also to a method for transmitting data via a rotating data transmission device.

2. Description of the Related Art

With rotating units such as radar installations or also computer tomographs, and also with linearly movable units such as crane and conveyor units, it is necessary to transmit electrical signals or energy between units that are movable relative to each other. For this, it is usual to provide a conductor structure in a first unit and a corresponding tap in a second unit. In the following explanations, the term "conductor arrangement" refers to all conceivable forms of conductor structures which are suitable for conducting electrical signals. This applies also to known contacting slide tracks or slip rings. Of substantial importance to transmission by means of rotating data transmission devices or linear "sliding conductors" which also may be designed to be non-contacting, is the short distance of transmission between the units that are movable relative to each other. Thus, optionally a signal may be coupled-out conductively or without contact in a near-field of the conductor arrangements.

A device for transmitting data in computer tomographs is known from U.S. Pat. No. 6,433,631. A transmission signal is applied to a strip conductor line in a rotating part. A tap is provided on the stationary part, which is guided along at a short distance of an order of magnitude of about 1 mm from the strip conductor line. With computer tomographs, the length of the strip conductor line is of an order of magnitude of about 5 meters. At data transmission rates of several tens of gigabits per second, signals must therefore be transmitted with a bandwidth of several gigahertz along a conductor system having a length of about 5 meters. Distortions of the signal arise as a result of frequency-dependent attenuation and dispersion. The signal from the data source (for example a data acquisition system) is supplied via a light-waveguide to the data transmission system. Thus, frequency dependent losses and dispersion will already arise in this light-waveguide. This leads to a deterioration of the input signal of the rotating data transmission system and therefore to a further deterioration of the total output signal.

For improvement of the signals from the optical data path, the application of clock recovery circuits is suggested in U.S. Pat. No. 6,862,299. However, these circuits have the disadvantage that they are usable only to a limited extent particularly at high dispersions.

BRIEF SUMMARY OF THE INVENTION

The following description of various embodiments of systems and methods utilizing rotating data transmission devices is not to be construed in any way as limiting the subject matter of the appended claims.

A rotating data transmission system, and in particular a rotating data transmission system for computer tomographs, is provided in which there is high tolerance to dispersion of the signals.

This objective is achieved with a rotating data transmission device for transmission of electrical signals between a first part and a second part, of which one of the parts is a rotating part and the other part is a stationary part, with the first part comprising: at least one data source for generating a digital data stream with a first optical transmitter; at least one first light-waveguide for transmitting the generated digital data stream from the at least one data source; at least one driver with a first optical receiver for receiving the digital data stream from the first light-waveguide; and a transmitting conductor arrangement controlled by the driver for receiving the data stream from the driver; and the second part comprising: a receiving coupler arrangement for tapping off signals from the transmitting conductor arrangement; at least one receiver for amplifying and processing signals received from the receiving coupler arrangement, and having a second optical transmitter; at least one second light-waveguide for transmitting the data stream from the receiver; and at least one data sink having at least one second optical receiver for receiving the data stream from the at least one second light-waveguide; and wherein at least one of the first optical receiver and the second optical receiver has at least one receiving element with an at least linear characteristic, an output signal of which is further processed via an equalizer and supplied to a digitizer.

In an embodiment the rotating data transmission device is disposed for data transmission between a rotating part and a stationary part of a computer tomograph.

The above objective is also achieved by a method for transmitting data via a rotating data transmission device, comprising the steps of: converting data from a data source to optical signals by means of a first optical transmitter; transmitting the optical signals by means of a first light-waveguide to a driver; receiving the optical signals with an optical receiver in the driver; optionally correcting frequency response and phase of a signal from the optical receiver by means of an equalizer; digitizing signals from the equalizer by means of a digitizer; feeding signals from the digitizer into a transmitting conductor arrangement of the rotating data transmission device; receiving signals from the transmitting conductor arrangement by means of a receiving coupler arrangement; optionally correcting frequency response and phase of the signals by means of an equalizer; converting signals from the equalizer to optical signals by means of a second optical transmitter; transmitting the optical signals by means of a second light-waveguide to a data sink; receiving the optical signals with an optical receiver in the data sink; and optionally correcting frequency response and phase of a signal from the optical receiver by means of an equalizer.

BRIEF DESCRIPTION OF THE DRAWINGS

In the following the invention will be described by way of example, without limitation of the general inventive concept, with the aid of examples of embodiment and with reference to the drawings.

Figure 1:
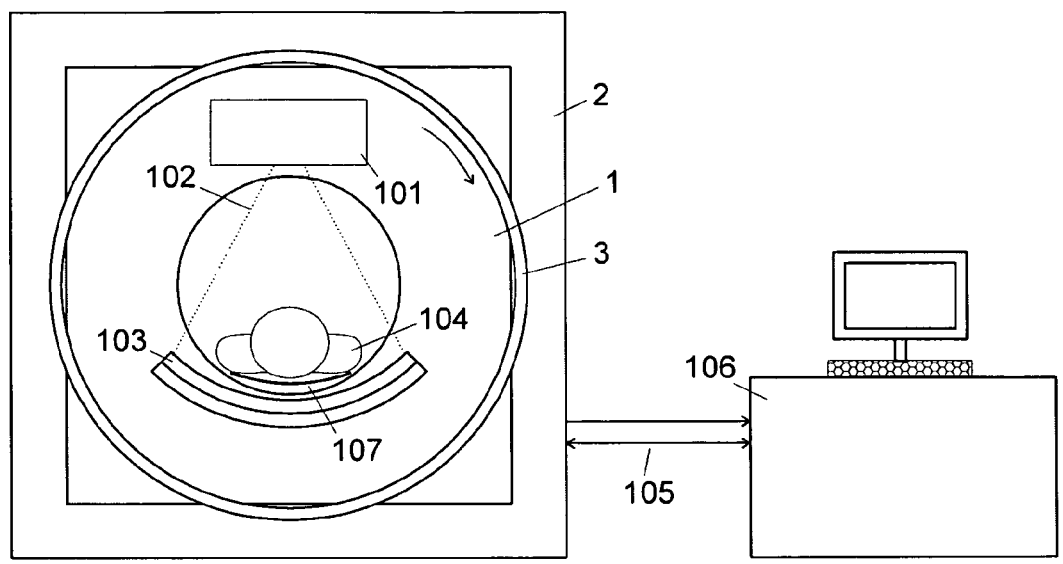
FIG. 1 schematically shows in a general form a computer tomograph.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 shows a computer tomograph in which an example of a rotating data transmission device is used. The computer tomograph (CT scanner) includes two mechanical main parts. A stationary part 2 serves as a base and support for the entire instrument in which a rotating part 1 rotates. A patient 104 is positioned on a berth 107 in an opening of a rotating part. An X-ray tube 101 and also a detector 103 disposed oppositely thereto are provided for scanning the patient by means of X-rays 102. The X-ray tube 101 and the detector 103 are disposed to be rotatable on the rotating part 1. A rotating data transmission device 3 serves as an electrical connection between the rotating part 1 and the stationary part 2. Herewith, on the one hand, the high electric power for feeding the X-ray tube 101 is transmitted in the direction towards the rotating part 1, and simultaneously the raw data of an image are transmitted in the other direction. Parallel to this, communication of control data in both directions is provided. An evaluation and control unit 106 serves for operating the computer tomograph and also for displaying the generated images. Communication with the computer tomograph is effected via a bidirectional link 105.

Figure 2:
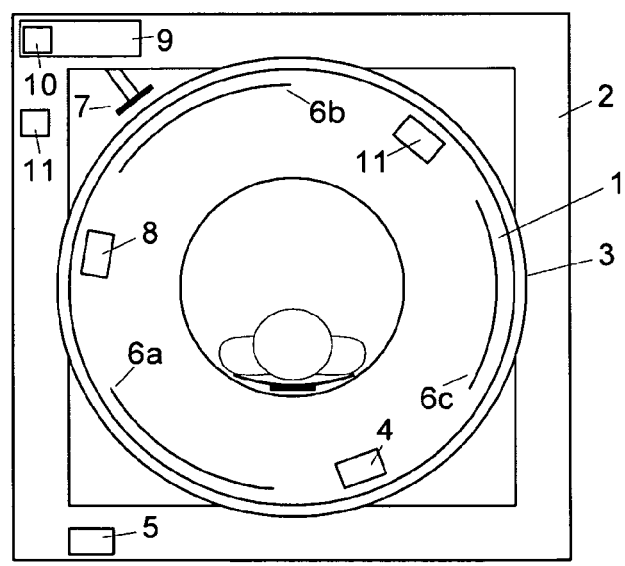
FIG. 2 schematically shows a data transmission system incorporated into the computer tomograph illustrated in FIG. 1.

FIG. 2 shows in a simplified form an example of an arrangement of a data transmission system. The data from a data source 4 (detector 103 with subsequent signal processing or DAS) on the rotating part 1 are processed with a first transmitter means 8 and relayed to the transmitting conductor arrangement which is shown herein by way of example as consisting of three parts 6a, 6b, 6c. This transmitting conductor arrangement now conducts the high-frequency signals. These are tapped-off by the receiving coupler arrangement 7. A receiving coupler arrangement which is firmly connected to the stationary frame is illustrated by way of example. The signals picked-up by this receiving coupler arrangement 7 are relayed to a first receiver means 9 for processing. Receiver means 9 is controlled by a local controller 11. The output signals from this are then conducted to a data sink 5. FIG. 2 shows as an example a phase locked loop (PLL) 10 in the receiver means 9. Similarly, alternatively, or additionally, a PLL may be present in the data sink 5.

Figure 3:
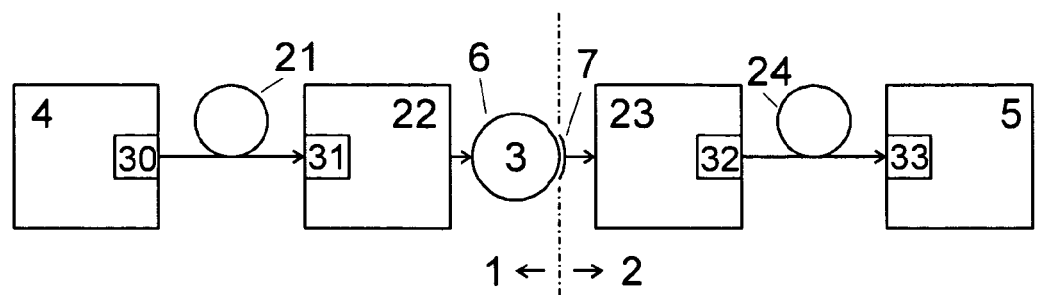
FIG. 3 shows a block diagram of the data transmission system depicted in FIG. 2.

FIG. 3 shows a block circuit diagram of a rotating data transmission device. On the rotating side of the computer tomograph, signals from the data source 4 are relayed to the driver 22 by means of a first light-waveguide 21. For this, a first optical transmitter 30 is provided in the data source 4, and a first optical receiver 31 is provided in the driver 22. The driver 22 feeds the transmitting conductor arrangement 6 of the rotating data transmission device 3. The transmitting conductor arrangement 6 can be an electrical transmitting conductor arrangement, for example a strip line. As an alternative to this, the transmitting conductor arrangement may also be a light-waveguide, for example a mirror trench, or a glass fiber, or a synthetic fiber. The driver 22 is also designed in accordance with the transmitting conductor arrangement. This has an optical transmitter in the case of an optical transmitting conductor arrangement, and an electrical transmitter in the case of an electrical transmitting conductor arrangement. On the stationary side 2 of the computer tomograph, the signals are tapped-off from the transmitting conductor arrangement by means of a receiving coupler arrangement 7. The receiving coupler arrangement is matched to the transmitting conductor arrangement and is optionally an electrical or optical coupler. The receiver 23 picks-up the signals from the receiving coupler arrangement and, in the case of optical signals, converts these to electrical signals. The electrical signals are then further processed within the receiver, for example amplified and/or filtered, and/or digitized. Finally, these signals are transmitted via a second optical transmitter 32 by means of a second light-waveguide 24 to a second optical receiver 33 in the data sink 5. At least one of the first optical receiver 31, the receiver 23, and the second optical receiver 33 has at least one receiving element 40 with an approximately linear characteristic, the output signal of which is further processed via an equalizer 41, and finally supplied to a digitizer 42, such as shown in FIG. 4 and described in more detail below.

Figure 4:
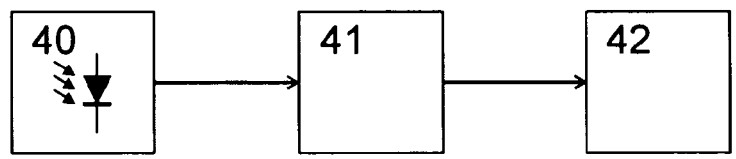
FIG. 4 shows a block diagram of an optical receiver.

FIG. 4 shows a receiver, provided for example as a first optical receiver 31, a receiver 23, and a second optical receiver 33 in FIG. 3. An optical receiving element 40, preferably a photodiode, has an approximately linear characteristic. The output signal of this optical receiving element is supplied to an equalizer 41 and therein subjected to a change of phase and frequency response, so that the signal distortions are minimized. The aim is to receive an output signal having an eye opening which is as large as possible. Subsequently, the signal from the equalizer 41 is converted to a digital signal by the digitizer 42.

A computer tomograph is illustrated and described herein by way of example. Data are transmitted between a rotating part 1 and a stationary part 2 of a computer tomograph. At least one data source 4 is provided on the rotating part, and at least one data sink 5 on the stationary part. A data source may be, for example, an X-ray detector 103 or its DAS (Data Acquisition System), or also any other desired control means, or a computer. The data from a plurality of data sources also may be combined with each other for transmission. A data sink may be a computer 106 for evaluating and processing the data, but also another control unit.

The rotating data transmission device 3 comprises a transmitting conductor arrangement 6 which is disposed on the rotating part 1, preferably along the periphery. The transmitting conductor arrangement is fed by a driver 22. The transmitting conductor arrangement comprises at least one conductor for guiding electromagnetic waves, which is preferably mounted along at least one circular segment or a circular track on the rotating part. The transmitting conductor arrangement may comprise, for example, mechanical slip rings, non-contacting electrical coupling elements such as inductive or capacitive coupling elements, or also light-waveguides. Similarly, the transmitting conductor arrangement may comprise a combination of a plurality of different coupling elements. When the transmitting conductor arrangement is an electrical line such as a strip line, then the driver 22 comprises an electrical driver. Here the term driver is understood to mean a circuit which adapts the signals at its input so that they may be fed into the transmitting conductor arrangement. Thus, it must be possible to feed electrical energy at a given signal amplitude into the given impedance of the transmitting conductor arrangement. As an alternative to this, the transmitting conductor arrangement also may be a light-waveguide, for example a glass fiber, or also a synthetic fiber. Similarly, the transmitting conductor arrangement also may be formed as a mirror trench. In the case of an optical transmitting conductor arrangement, the driver 22 comprises a light source for converting electrical input signals to optical output signals. The receiving coupler arrangement 7 is disposed to be rotatable relative to the rotating part, i.e. on the stationary part 2. It is designed to tap signals from the transmitting conductor arrangement 6. Accordingly, it is configured to be an electrical or optical coupler. The signals from the receiving coupler arrangement 7 are supplied to a receiver 23. This receiver converts optical to electrical signals if required, and amplifies the signals from the receiving coupler arrangement, and processes the signals if required.

At least one light-waveguide 21, 24 is provided as a connection between the data source 4 and the driver 22 and/or between the receiver 23 and the data sink 5. Thus, for example, the connection between the data source 4 and the driver 22 may be effected by means of light-waveguides, whilst in the same arrangement the connection between the receiver 23 and the data sink 5 is designed to be an electrical connecting line. Similarly, the electrical and the optical connections also may be interchanged. Alternatively, also two optical connections may be employed. Now, in order to transmit optical signals via a light-waveguide 21, 24, suitable optical transmitters 30, 32 and optical receivers 31, 33 are provided. At least one of the optical receivers 31, 33, or also a circuit in the receiver 23, has at least one receiving element 40 which supplies an input signal to the equalizer 41. The equalizer 41 adapts the signal so that as large as possible an eye-opening of the eye pattern is achieved. For this, the amplitude and phase of individual spectral components of the signal are changed. Following the equalizer, a digitizer 42 is provided for converting the output signal from the equalizer to a digital signal. In an advantageous manner, the receiving element 40 has an approximately linear characteristic.

In a particularly advantageous embodiment, the output signal of the first optical receiver 31 following a receiving element 40 having an approximately linear characteristic is sent via a linear driver to the transmitting conductor arrangement 6. Furthermore, an equalizer is provided in the receiver 23 for performing a frequency response and phase correction of the transmission path comprising the first light-waveguide 21 and the rotating data transmission device 3.

In another embodiment, the second optical transmitter 32 is a linear transmitter which is fed by the receiver 23 having an approximately linear characteristic. Furthermore, the optical receiver 33 has an equalizer for performing a frequency response and phase correction of the transmission path comprising the rotating data transmission device 3 and the second light-waveguide 24.

In another embodiment, the equalizer is designed to be an adaptive equalizer which dynamically adapts to the conditions of the preceding transmission path, so that the eye opening of the eye pattern of its output signal is the maximum opening. Alternatively, the equalizer also may be controlled so that the bit error rate on the output side of the digitizer is a minimum.

Furthermore, it is of advantage when a CDR circuit (clock and data recovery), particularly preferred with an integrated PLL, is disposed on the output side of the digitizer 42. With this circuit, the jitter of the digital signal regenerated by the digitizer can be then reduced further.

Thus, a signal distortion caused by the band limitation of the entire transmission path, or of at least a part of the transmission path, or of at least one component located on the input side of at least one of the optical receivers 31, 33, can be first compensated with an equalizer located in the signal path. The CDR circuit results in an additional reduction of the jitter.

The equalizer can be any equalizer which is able to improve a signal that is transmitted via a band-limited transmission path. In the simplest case, this may be a simple amplifier that enhances the high-frequency frequency-components (high-pass characteristic). However, it is better to employ a feed forward equalizer (FFE). An FFE of this kind has a parallel circuit formed by a linear amplifier and an amplifier with a high-pass characteristic. It is of even more advantage to use a feed forward equalizer (DFE). This non-linear equalizer takes into account a preceding symbol in order to identify an actual symbol. In this case, the equalizer typically contains the digitizer 42.

The principle of the particularly advantageous embodiment of a signal transmission device in a computer tomograph as described herein is also usable in other applications for transmitting signals from a data source to a data sink that is rotatably or linearly movable relative to the source. Examples of application are general rotating data transmission devices as used in radar installations, rotary transfer machines, or cranes.

The transmission direction as illustrated herein was chosen to be that from a rotor to a stator, because this corresponds to the most frequent case of use. Similarly, however, transmission in the opposite direction or even bidirectional transmission is possible.

For the sake of clarity, no distinction is made in this document between a transmission between units that are movable relative to each other, and between a stationary unit and units that are movable relative thereto, because this is only a matter of reference to location and has no bearing on the manner of operation of the invention.

It will be appreciated to those skilled in the art having the benefit of this disclosure that this invention is believed to provide systems and methods utilizing rotating data transmission devices. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. An apparatus comprising a rotating data transmission device for transmission of electrical signals between a first part and a second part of the apparatus, of which one of the parts is a rotating part and the other part is a stationary part, with the first part comprising:

at least one data source for generating a digital data stream with a first optical transmitter;

at least one first light-waveguide for transmitting the generated digital data stream from the at least one data source;

at least one driver with a first optical receiver for receiving the digital data stream from the first light-waveguide; and a transmitting conductor arrangement controlled by the driver for receiving the data stream from the driver;

and the second part comprising:

a receiving coupler arrangement for tapping off signals from the transmitting conductor arrangement;

at least one receiver for amplifying and processing signals received from the receiving coupler arrangement, and having a second optical transmitter;

at least one second light-waveguide for transmitting the data stream from the receiver; and at least one data sink having at least one second optical receiver for receiving the data stream from the at least one second light-waveguide; and wherein at least one of the first optical receiver and the second optical receiver has at least one receiving element with an at least linear characteristic, an output signal of which is further processed via an equalizer that supplies a corrected frequency and phase of an analog signal to a digitizer.

2. The apparatus according to claim 1, wherein the receiver of the second part for amplifying and processing signals received from the receiving coupler arrangement has an equalizer for frequency response and phase correction of signals received from the receiving coupler arrangement.

3. The apparatus according to claim 2, wherein the first optical receiver has at least one receiving element with an approximately linear characteristic, an output signal of which is passed to the transmitting conductor arrangement via a linear driver, and wherein the equalizer of the receiver of the second part for amplifying and processing signals received from the receiving coupler arrangement is provided for frequency response and phase correction of a transmission path comprising the first light-waveguide and the rotating data transmission device.

4. The apparatus according to claim 2, wherein the receiver of the second part for amplifying and processing signals received from the receiving coupler arrangement has an approximately linear characteristic, wherein the second optical transmitter is a linear transmitter, and wherein the second optical receiver has an equalizer which is provided for frequency and response and phase correction of a transmission path comprising the rotating data transmission device and the second light-waveguide.

5. The apparatus according to claim 1, wherein the equalizer is an adaptive equalizer.

6. The apparatus according to claim 1, further comprising a clock and data recovery circuit with a phase locked loop for reducing jitter of a signal generated by the digitizer.

7. The apparatus according to claim 1, wherein the rotating data transmission device is disposed between the rotating part and the stationary part.

8. The apparatus according to claim 1, wherein the apparatus is a computer tomograph.

9. A method for transmitting data via a rotating data transmission device, comprising:

converting data from a data source to optical signals by means of a first optical transmitter;

transmitting the optical signals by means of a first light-waveguide to a driver;

linearly receiving the optical signals with a first optical receiver in the driver;

equalizing the received optical signals in frequency and phase in the first optical receiver;

feeding the equalized optical signals from the driver into a transmitting conductor arrangement of the rotating data transmission device;

receiving signals from the transmitting conductor arrangement at a second receiver by means of a receiving coupler arrangement;

transmitting the signals from the second receiver to a data sink by means of a second light-waveguide;

linearly receiving the signals with a third optical receiver; and equalizing the received optical signals in frequency optical phase the third optical receiver, and feeding the equalized optical signals to a data sink.

10. The method according to claim 9, further comprising:

correcting frequency response and phase of a signal received in the driver by means of the equalizer of the first optical receiver; and digitizing analog signals from the equalizer by means of a digitizer of the first optical receiver, wherein the step of feeding signals from the driver into the transmitting conductor arrangement comprises feeding signals from the digitizer into the transmitting conductor arrangement.

11. The method according to claim 9, further comprising:

correcting frequency response and phase of signals received from the transmitting conductor arrangement in the second receiver by means of an equalizer; and converting signals from the equalizer to optical signals by means of an optical transmitter in the second receiver.

12. The method according to claim 9, further comprising correcting frequency response and phase of a signal received in the third optical receiver by means of an equalizer of the third optical receiver.

* * * * *

UNITED STATES PATENT AND TRADEMARK OFFICE
CERTIFICATE OF CORRECTION

PATENT NO. : 8,195,051 B2
APPLICATION NO. : 12/395828
DATED : June 5, 2012
INVENTOR(S) : Lindorfer It is certified that error appears in the above-identified patent and that said Letters Patent is hereby corrected as shown below:

IN THE CLAIMS

Claim 9, col. 8, lines 23-25, should read: equalizing the received optical signals in frequency ~~optical~~ and phase in the third optical receiver, and feeding the equalized optical signals to a data sink.

Signed and Sealed this
Eleventh Day of September, 2012

David J. Kappos
*Director of the United States Patent and Trademark Office*